(12) United States Patent
Omata et al.

(10) Patent No.: US 9,793,778 B2
(45) Date of Patent: Oct. 17, 2017

(54) DRIVE APPARATUS AND ROBOT DEVICE

(71) Applicant: NIKON CORPORATION, Tokyo (JP)

(72) Inventors: Kenji Omata, Utsunomiya (JP); Takashi Nagase, Iruma (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/940,949

(22) Filed: Nov. 13, 2015

(65) Prior Publication Data

US 2016/0072366 A1 Mar. 10, 2016

Related U.S. Application Data

(63) Continuation of application No. PCT/JP2014/062945, filed on May 15, 2014.

(30) Foreign Application Priority Data

May 17, 2013 (JP) ................................. 2013-104922

(51) Int. Cl.
*H02K 11/00* (2016.01)
*H02K 7/14* (2006.01)
(Continued)

(52) U.S. Cl.
CPC ................ *H02K 7/14* (2013.01); *B25J 9/126* (2013.01); *B25J 13/088* (2013.01); *H02K 5/10* (2013.01);
(Continued)

(58) Field of Classification Search
CPC  H02K 7/116; H02K 11/21; H02K 7/14; B25J 13/0088; B25J 9/126; Y10S 901/02
(Continued)

(56) References Cited

U.S. PATENT DOCUMENTS

2005/0113977 A1    5/2005  Nihei et al.
2007/0210661 A1*   9/2007  Schmidt .................. H02K 5/06
                                                      310/90
(Continued)

FOREIGN PATENT DOCUMENTS

CN          101476612 A    7/2009
EP            1533544 A2   5/2005
(Continued)

OTHER PUBLICATIONS

Aug. 12, 2014 Search Report issued in International Patent Application No. PCT/JP2014/062945.
(Continued)

*Primary Examiner* — Hanh Nguyen
(74) *Attorney, Agent, or Firm* — Oliff PLC

(57) ABSTRACT

A drive apparatus includes a motor having a drive part that rotates a first shaft member; a transmission part that transmits rotation of the first shaft member to a second shaft member which is different from the first shaft member; a first detection device provided at the first shaft member to detect information regarding rotation of the drive part; a second detection device provided at the second shaft member to detect information regarding rotation of the transmission part; and a prevention part that prevents movement of foreign substance toward a detection part which includes at least one of the first detection device and the second detection device.

25 Claims, 8 Drawing Sheets

(51) Int. Cl.
  *H02K 7/116* (2006.01)
  *B25J 13/08* (2006.01)
  *H02K 5/10* (2006.01)
  *H02K 11/21* (2016.01)
  *B25J 9/12* (2006.01)

(52) U.S. Cl.
  CPC ......... *H02K 7/116* (2013.01); *H02K 11/0015* (2013.01); *H02K 11/21* (2016.01); *Y10S 901/02* (2013.01); *Y10S 901/23* (2013.01)

(58) Field of Classification Search
  USPC ...... 310/60 A, 68 B, 68 C, 51, 90; 901/2, 23
  See application file for complete search history.

(56) References Cited

U.S. PATENT DOCUMENTS

| | | | |
|---|---|---|---|
| 2010/0319478 A1 | 12/2010 | Tominaga | |
| 2012/0210816 A1* | 8/2012 | Izumi | B25J 9/1005 74/490.03 |
| 2013/0144553 A1* | 6/2013 | Omata | G01D 5/245 702/151 |
| 2013/0257230 A1* | 10/2013 | Park | H02K 7/003 310/68 B |

FOREIGN PATENT DOCUMENTS

| | | |
|---|---|---|
| EP | 2264865 A2 | 12/2010 |
| JP | 5-061555 U | 8/1993 |
| JP | H05-73367 U | 10/1993 |
| JP | 2522495 Y2 | 1/1997 |
| JP | 2002-089638 A | 3/2002 |
| JP | 2005-153047 A | 6/2005 |
| JP | 2008-176982 A | 7/2008 |
| JP | 2009-121550 A | 6/2009 |
| JP | 2011-024406 A | 2/2011 |
| JP | 2011-134050 A | 7/2011 |
| JP | 2012-257402 A | 12/2012 |
| WO | 2013/039204 A1 | 3/2013 |

OTHER PUBLICATIONS

Aug. 12, 2014 Written Opinion issued in International Patent Application No. PCT/JP2014/062945.
Daxian, Cheng, "Machine Design Handbook, Offprint, Bearing," Chemical Industry Press, (2004), pp. 223-235.
Jul. 15, 2016 Office Action issued in Chinese Patent Application No. 201480029129.3.
Aug. 23, 2016 Office Action issued in Japanese Patent Application No. 2015-517129.

* cited by examiner

DRIVE APPARATUS AND ROBOT DEVICE

CROSS-REFERENCE TO RELATED APPLICATION

Priority is claimed on Japanese Patent Application No. 2013-104922, filed May 17, 2013. This application is a continuation application of International Patent Application No. PCT/JP2014/062945, filed on May 15, 2014. The contents of the above-mentioned application are incorporated herein by reference.

BACKGROUND

The present invention relates to a drive apparatus and a robot device.

As a detecting apparatus that detects both of a rotational speed of a motor and a rotational speed of a reduction gear connected to an input shaft of the motor, for example, Japanese Utility Model Registration No. 2522495 discloses a drive apparatus configured to detect rotation of a hollow input shaft that is rotated by the driving of the motor using a first detection device, and detects rotation of an output shaft provided on the reduction gear and passing through a hollow portion of the input shaft using a second detection device.

SUMMARY

However, in the configuration of the drive apparatus described in Japanese Utility Model Registration No. 2522495, there was a possibility of grease in the reduction gear flowing into the first detection device and the second detection device, which are provided at the anti-load side motor, through a gap of the hollow input shaft. Therefore, there is a possibility that foreign substance such as grease or powders contained in the grease is adhered to the first detection device and the second detection device, which can lead to serious problems such as a decrease in the detection accuracy. Further, in the case of using the drive apparatus in a vertical state, when the reduction gear is disposed at the upper side and each sensor is disposed on the lower side, grease or the like is likely to flow downward under the influence of gravity, thereby, there is a possibility of causing problems of quality and reliability, such as undetectable problems.

An object of the aspects of the present invention is to provide a highly reliable drive apparatus and robot device capable of preventing a reduction in the detection accuracy, by disposing a mechanism part so that grease or the like in the reduction gear connected to the motor does not flow to each sensor side.

According to a first aspect of the present invention, there is provided a drive apparatus which is provided with a motor having a drive part that rotates a first shaft member, a transmission part that transmits rotation of the first shaft member to a second shaft member which is different from the first shaft member, a first detection device provided at the first shaft member to detect information regarding rotation of the drive part, a second detection device provided at the second shaft member to detect information regarding rotation of the transmission part, and a prevention part that prevents movement of foreign substance toward a detection part which includes at least one of the first detection device and the second detecting device.

According to a second aspect of the present invention, there is provided a robot device which is provided with a shaft member, a drive apparatus that drives the shaft member, and a controller that controls the drive apparatus, and in which the drive apparatus according to the first aspect of the present invention is used as a drive apparatus.

According to the aspects of the present invention, it is possible to provide a highly reliable drive apparatus and robot device capable of preventing a decrease in detection accuracy.

DESCRIPTION OF EMBODIMENTS

Figure 1:
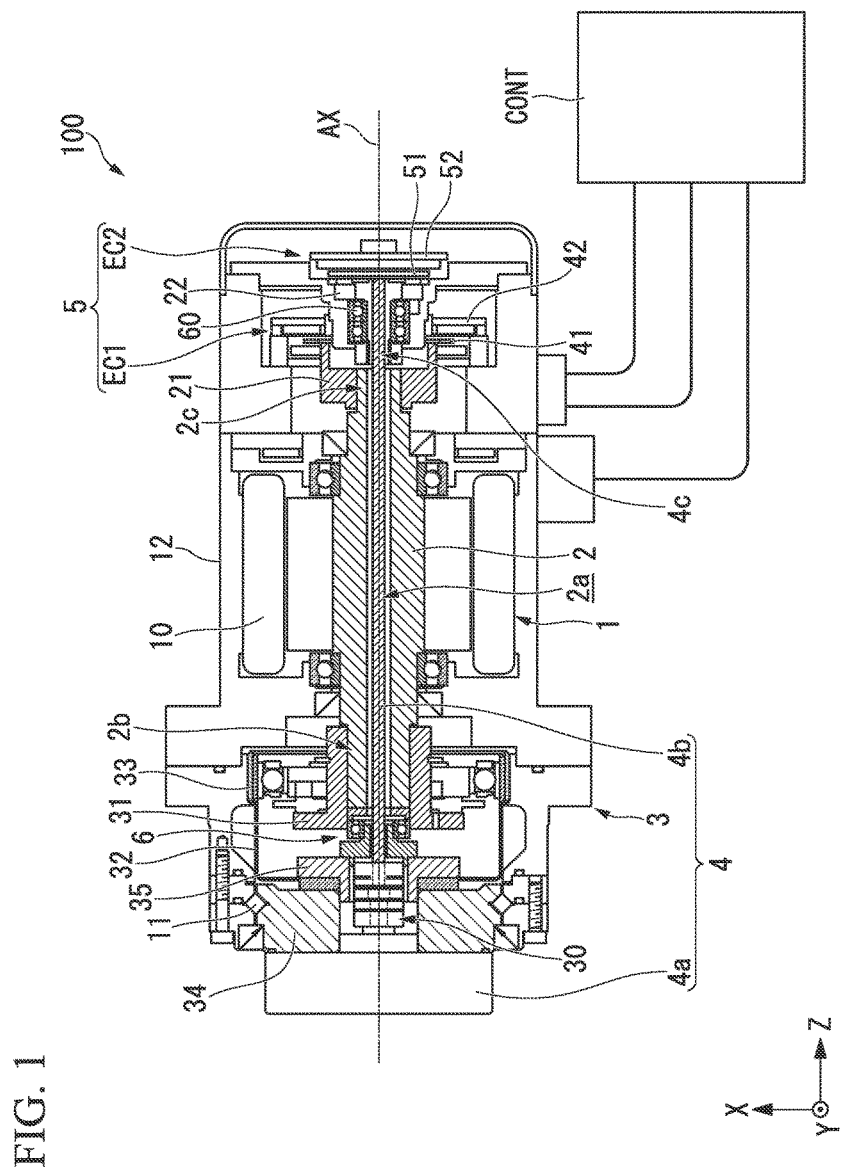
FIG. 1 is a cross-sectional view illustrating an overall configuration of a drive apparatus according to a first embodiment.

Hereinafter, a first embodiment of the present invention will be described with reference to the drawings.

A drive apparatus 100 is provided with a motor 1, a hollow motor shaft (a first shaft member) 2, a reduction gear (a transmission part, a transmission member) 3, an output shaft (a second shaft member) 4, a detection part 5, a prevention part (a preventer) 6, a housing 12 configured to house the above mentioned configurations, and a controller (a processor, a circuit, circuitry, processing circuitry) CONT configured to control the respective units.

The motor 1 is a so-called synchronous motor type servo motor in which a permanent magnet is disposed in a rotary section and a coil is disposed in a stationary section. The shaft of the motor serves as a hollow motor shaft 2. The output shaft 4 is rotated at a rotational speed at which the rotation of the motor 1 is decelerated by the reduction gear 3 disposed on the load side. The hollow motor shaft 2 and the output shaft 4 are disposed to rotate about the axis of a common rotation axis AX.

Hereinafter, in the description of each drawing, an XYZ orthogonal coordinate system is set, and a positional relationship between the respective members will be described, while referring to the XYZ orthogonal coordinate system. The rotation axis AX direction of the hollow motor shaft 2 and the output shaft 4 is set as a Z axis direction, and each of orthogonal directions on a plane perpendicular to the Z-axis direction is set as an X-axis direction and a Y-axis direction.

The hollow motor shaft 2 is formed in a substantially cylindrical shape and is provided with a hollow portion 2a. The hollow motor shaft 2 rotates about the axis of the rotation axis AX by the rotary driving of the motor 1 (driving part (a force generator) 10) and transmits the rotation to the reduction gear 3. The hollow motor shaft 2 is provided to penetrate the motor 1. Both axial end portions 2b and 2c of the hollow motor shaft 2 in the rotation axis AX protrude from the motor 1. A rotation hub 21 is integrally connected to the end portion of the +Z side of the hollow motor shaft 2.

The reduction gear 3 transmits the rotation of the hollow motor shaft 2 to the output shaft. For example, a harmonic gear mechanism is used as the reduction gear 3. In addition to this, it is also possible to use, for example, a gear reducer, a planetary gear mechanism or the like. The reduction gear 3 has a first transmission member (a wave generator) 31, a second transmission member (a flex spline) 32 and a third transmission member (a circular spline) 33. These members are disposed so as to be meshed with one another. The second transmission member 32 is connected to the output shaft 4 via a fourth transmission member 34. In the reduction gear 3, for the smooth rotation, a lubricant (such as grease) is used between the first transmission member 31, the second transmission member 32 and the third transmission member 33.

The output shaft 4 has a first shaft part 4a and a second shaft part 4b. The first shaft part 4a and the second shaft part 4b rotate about the axis of the rotation axis AX using the rotation axis AX as a center. Thus, the hollow motor shaft 2, the first shaft part 4a and the second shaft part 4b are disposed in a coaxial state. The first shaft part 4a and the second shaft part 4b are connected by a coupling part (a coupling, an adjuster) 30.

The coupling part 30 is able to adjust the eccentricity of the output shaft 4 relative to the rotation axis AX.

The first shaft part 4a is supported to a housing portion (not illustrated) of the reduction gear 3 via a bearing member 11 such as a cross roller bearing. The first shaft part 4a is disposed on the −Z side of the hollow motor shaft 2.

The second shaft part 4b is disposed on the +Z side of the coupling part 30. The second shaft part 4b is inserted into the hollow portion 2a and is disposed to pass through the input shaft 2 in the Z direction. The second shaft part 4b has a protruding portion 4c that protrudes to the +Z side from the hollow portion 2a.

The detection part 5 has a first detection device EC1 and a second detection device EC2.

The first detection device EC1 detects information about the rotation of the motor 1. The first detection device EC1 includes the rotation hub 21, a scale 41 and a detector 42. The rotation hub 21 is fixed to the end portion 2c on the +Z side of the hollow motor shaft 2. The scale 41, for example, is formed in a circular plate shape and is disposed parallel to a plane perpendicular to the rotation axis AX. The scale 41 is fixed to the rotation hub 21. Thus, the input shaft 2, the rotation hub 21 and the scale 41 are integrally rotatable.

The detector 42 is disposed to face the scale 41. On the surface of the scale 41 facing the detector 42, a first indicator pattern (not illustrated) is formed in a circumferential direction. The detector 42 detects information regarding the rotation of the scale 41, that is, information regarding the rotation of the input shaft 2 and the motor 1, by receiving the detection light reflected by the indicator pattern of the scale 41, for example, using a light-receiving element such as a photodiode.

The second detection device EC2 detects information about the rotation of the reduction gear 3. The second detection device EC2 has a rotation hub 22, a scale 51 and a detector 52. The rotation hub 22 is fixed to the protruding portion 4c of the second shaft part 4b. The scale 51, for example, is formed in a circular plate shape and is disposed parallel to a plane perpendicular to the rotation axis AX. The scale 51 is fixed to the rotation hub 22. Thus, the second shaft part 4b, the rotation hub 22 and the scale 51 are integrally rotatable.

The detector 52 is disposed to face the scale 51. On the surface of the scale 51 facing the detector 52, a second indicator pattern (not illustrated) is formed in the circumferential direction. The detector 52 detects information about the rotation of the scale 51, that is, information about the rotation of the output shaft 4 and the reduction gear 3, by receiving the detection light reflected by the second indicator pattern of the scale 51, for example, using a light-receiving element such as a photodiode.

The prevention part 6 prevents the movement of foreign substance toward the detection part 5. The foreign substance, for example, includes grease or the like discharged from the reduction gear 3. When the grease discharged from the reduction gear 3 is moved to the detection part 5 side via the hollow motor shaft 2 and adheres to each part of the detection part 5, in some cases, it may affect the detection accuracy in the detection part 5. The prevention part 6 is able to reduce such an adverse effect on detection accuracy, by preventing the movement of the foreign substance toward the detection part 5. The prevention part 6, for example, is disposed between the reduction gear 3 and the detection part 5.

Figure 2:
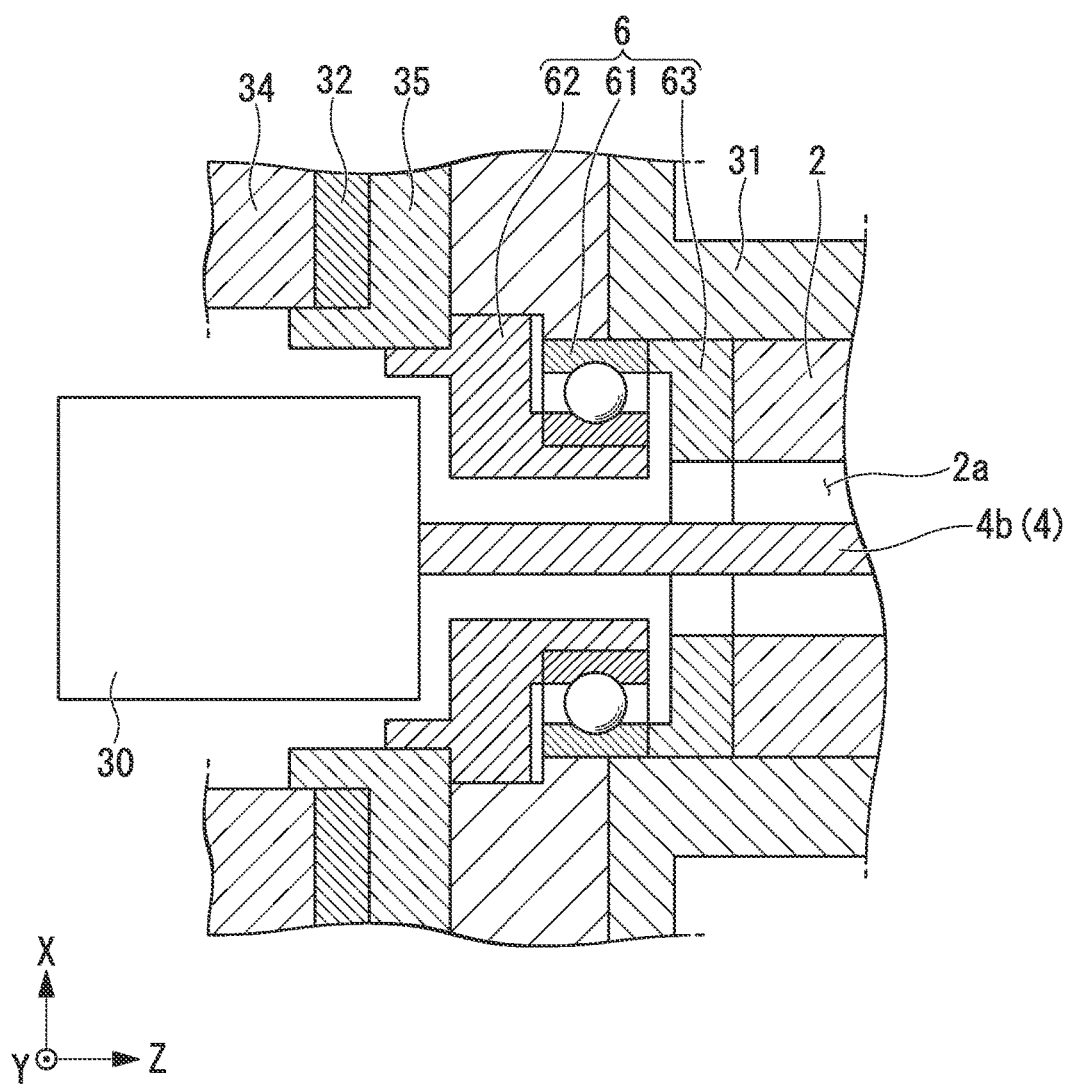
FIG. 2 is a cross-sectional view of a partial configuration of the drive apparatus according to the first embodiment.

FIG. 2 is an enlarged cross-sectional view illustrating a configuration of the prevention part 6.

As illustrated in FIG. 2, the prevention part 6 is provided on the outside of the hollow portion 2a of the hollow motor shaft 2. The prevention part 6 has a seal bearing (a seal) 61 and bearing holding members 62 and 63. The seal bearing 61 comes in contact with the first transmission member 31 and the fourth transmission member 34 of the reduction gear 3 by being in a astride manner therebetween. A part between the first transmission member 31 and the fourth transmission member 34 is covered by the seal bearing 61. Thus, the outflow of the foreign substance (e.g., a lubricant or the like) attempting to flow out between the first transmission member 31 and the fourth transmission member 34 is prevented by the bearing holding members 62 and 63 and the seal bearing 61.

The seal bearing 61 and the bearing holding members 62 and 63 are disposed so as not to come into contact with each of the coupling part 30 and the second shaft part 4b. Therefore, the friction torque of the seal bearing 61 and the bearing holding members 62 and 63 does not act on the coupling part 30 and the second shaft part 4b, and torsion or vibration is not applied to the coupling part 30 and the second shaft part 4b.

Next, the operation of the drive apparatus 100 of this embodiment will be described.

When the hollow motor shaft 2 is rotated by driving of the motor 1, the output shaft 4 rotates at a rotation speed corresponding to a speed reduction ratio of the reduction gear 3 via the reduction gear 3.

The rotation hub 21 and the scale 41 are rotated by the rotation of the hollow motor shaft 2, and the detector 42 detects information about the rotation of the scale 41, thereby being able to detect the information about the rotation of the motor 1. Similarly, the rotation hub 22 and the scale 51 are rotated by the rotation of the output shaft 4, and the detector 52 detects the information about the rotation of the scale 51, thereby being able to detect the information about the rotation of the reduction gear 3.

In the rotation of the output shaft 4, the first shaft part 4a and the second shaft part 4b integrally rotate. In the vicinity of the end portion on the +Z side of the output shaft 4, the second shaft part 4b is supported on the rotation hub 21 via a rotary bearing 60. Thus, even when the second shaft part 4b becomes long and the tip thereof at the second detection device EC2 side is displaced from the rotation axis AX due to an error of perpendicularity or the like, the scale 41 and the scale 51 rotate with respect to the rotation axis AX at high concentricity and coaxiality, without causing axial run-out or the like, and without being nearly eccentric.

Further, since the second shaft part 4b is connected to the first shaft part 4a via the coupling part 30, even when the first shaft part 4a is eccentric with respect to the second shaft part 4b, or even when the axis of the first shaft part 4a is inclined with respect to the axis of the second shaft part 4b, the coupling part 30 is elastically deformed to adjust (absorb) the eccentricity or inclination. Therefore, the second shaft part 4b rotates with respect to the rotation axis AX at high concentricity and coaxiality, without adversely affecting the position and the inclination of the axis of the first shaft part 4a.

Further, in this embodiment, the seal bearing 61 and the bearing holding members 62 and 63 are disposed to prevent the outflow of foreign substance (e.g., grease or the like) which attempts to flow out between the first transmission member 31 and the fourth transmission member 34.

As described above, in this embodiment, the motor 1 that rotates the hollow motor shaft 2, the reduction gear 3 that transmits the rotation of the hollow motor shaft 2 to the output shaft 4, the first detection device EC1 provided in the hollow motor shaft 2 to detect the information regarding the rotation, the second detection device EC2 provided in the output shaft 4 to detect the information regarding the rotation of the reduction gear 3, and the prevention part 6 that prevents the movement of foreign substance toward the detection part 5 which includes at least one of the first detection device EC1 and the second detection device EC2 are included. Therefore, for example, the movement of the foreign substance toward the detection part 5 from the reduction gear 3 is prevented.

In the reduction gear 3, for the smooth rotation, a lubricant (such as grease) is used between the first transmission member 31, the second transmission member 32 and the third transmission member 33. In some cases, the lubricant is discharged from the reduction gear 3 along with the rotation. When the lubricant discharged from the reduction gear 3 is moved to the detection part 5 side via the output shaft 4 and adheres to each part of the detection part 5, the lubricant may affect the detection accuracy in the detection part 5. Thus, since the movement of the foreign substance toward the detection part 5 is prevented by the prevention part 6, it is possible to prevent a decrease in detection accuracy.

Moreover, since the prevention part 6 is provided not to be in contact with the second shaft part 4b of the output shaft 4, the action of friction torque on the second shaft part 4b is avoided. This makes it possible to provide the prevention part 6 even when the second shaft part 4b rotates at a high speed.

Second Embodiment

Next, a second embodiment of the present invention will be described.

Figure 3:
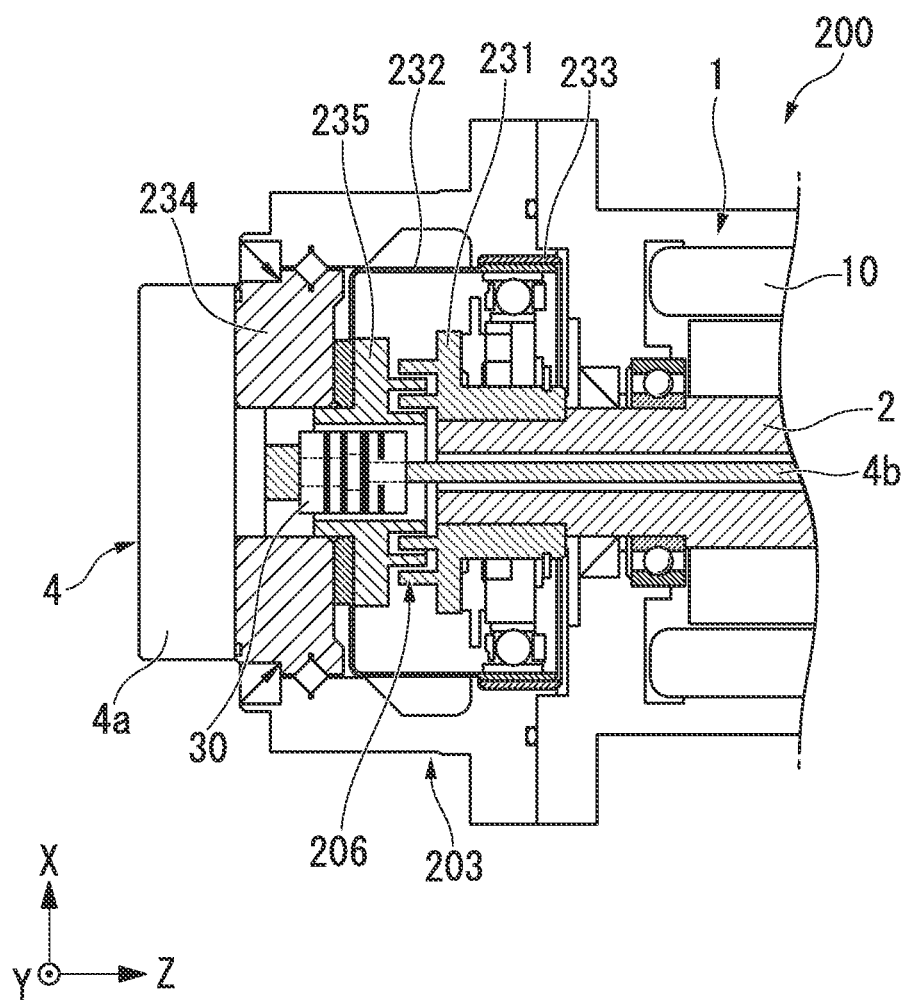
FIG. 3 is a cross-sectional view of a partial configuration of a drive apparatus according to a second embodiment.

FIG. 3 is a cross-sectional view illustrating a configuration of a drive apparatus 200 according to the second embodiment. In this embodiment, constituents identical or equivalent to the constituents of the first embodiment are denoted by the same reference numerals, and the description thereof will be omitted or simplified.

The first embodiment has a configuration in which the seal bearing 61 and the bearing holding members 62 and 63 are provided as the prevention part 6. This embodiment is different from the first embodiment in that the prevention part 206 has a labyrinth structure, as illustrated in FIG. 3.

The labyrinth structure is a non-contact structure, therefore, it can be used in the case of the higher speed rotation.

The reduction gear 203 has a first transmission member 231, a second transmission member 232 and a third transmission member 233. These members are disposed so as to be engaged with one another. Further, the third transmission member 233 is disposed so as to be engaged with the second transmission member 232. The second transmission member 232 is connected to the output shaft 4 via the fourth transmission member 234. Also, a prevention member 235 is attached to the fourth transmission member 234.

The first transmission member 231 has a plurality of protruding portions on the −Z side. The prevention member 235 has a plurality of protruding portions on the +Z axis side. The protruding portions of the first transmission member 231 and the protruding portions of the prevention member 235 are disposed so as to be alternatively combined with each other with a slight gap therebetween. Other configurations are the same as those of the first embodiment.

Thus, in this embodiment, the prevention part 206 has a labyrinth structure in which the first transmission member 231 and the prevention member 235 are partially deformed. By the prevention part 206, the lubricant used between the first transmission member 231, the second transmission member 232, the third transmission member 233 and the fourth transmission member 234 can be prevented from moving to the inner diameter side.

Third Embodiment

Next, a third embodiment of the present invention will be described.

Figure 4:
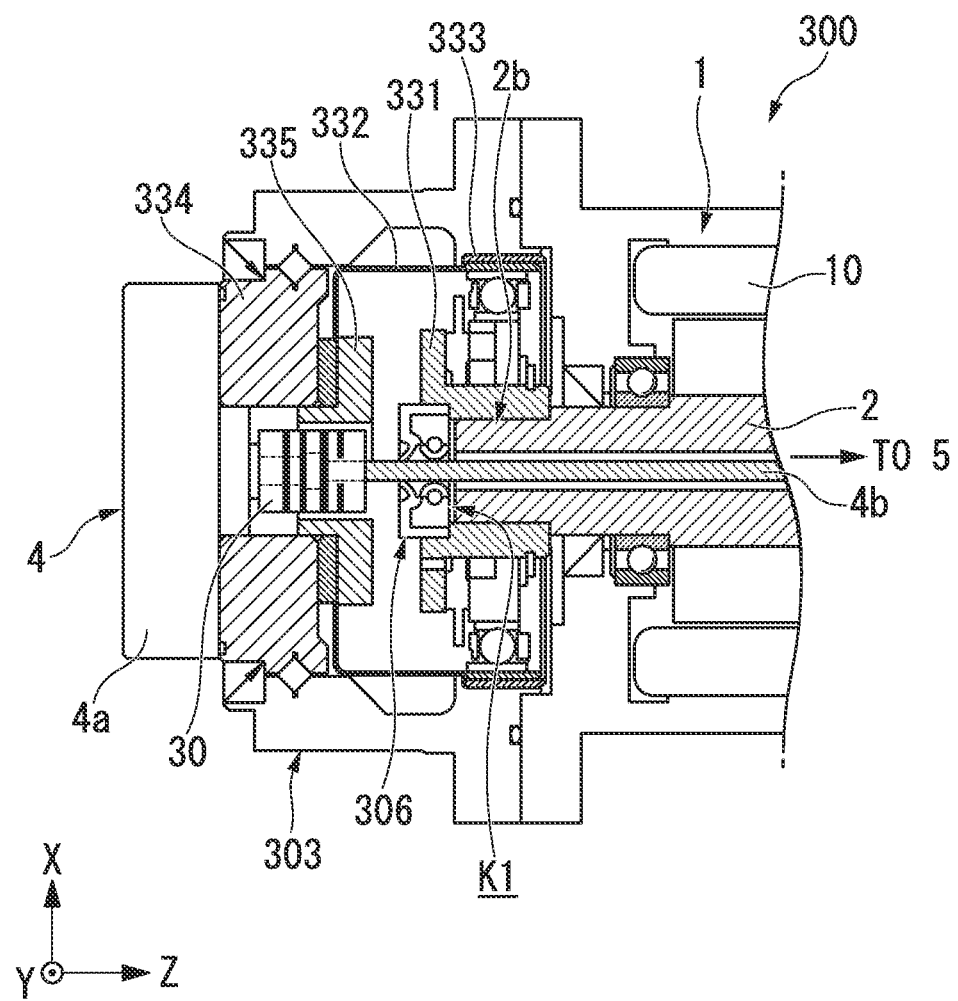
FIG. 4 is a cross-sectional view of a partial configuration of a drive apparatus according to a third embodiment.

FIG. 4 is a cross-sectional view illustrating a configuration of a drive apparatus 300 according to the third embodiment. In this embodiment, the constituents identical or equivalent to the constituents of the first embodiment are denoted by the same reference numerals, and the description thereof will be omitted or simplified.

This embodiment is different from the above-mentioned embodiments in that, as a prevention part, an oil seal mechanism (a shielding part, a shield) 306 is provided between a reduction gear 303 and an input shaft 2. The reduction gear 303 has a first transmission member 331, a second transmission member 332, a third transmission member 333 and a fourth transmission member 334. Other configurations are the same as those of the first embodiment. Since the oil seal mechanism is a simple structure and a complete contact type, it can be used in applications that require high reliability at the low-speed rotation.

The oil seal mechanism 306 is disposed on the −Z side of the end portion 2b of the input shaft 2. The oil seal mechanism 306 is disposed in a contact manner over the circumference of the outer circumferential surface of the second shaft part 4b of the output shaft 4. Thus, the hollow portion 2a of the input shaft 2 is in a state of being blocked by the oil seal mechanism 306. Therefore, the movement of the foreign substance attempting to move in the Z direction along the second shaft part 4b is prevented.

Further, the oil seal mechanism 306 is disposed between the first transmission member 331 of the reduction gear 303 and the second shaft part 4b of the output shaft 4. Thus, the movement of the foreign substance (lubricant or the like) attempting to flow out between the first transmission member 331 and the second shaft part 4b is prevented. The oil seal mechanism 306 covers the inner circumferential surfaces between the first transmission member 331 and the second transmission member 332 of the reduction gear 303. Thus, the movement of the foreign substance (lubricant or the like) attempting to flow out between the first transmission member 331 and the second transmission member 332 is prevented.

Further, the oil seal mechanism 306 is configured to be in contact with the second shaft part 4b of the output shaft 4. Therefore, the oil seal mechanism 306, for example, can be used when the second shaft part 4b rotates at a low speed, and can prevent the movement of the foreign substance.

Fourth Embodiment

Next, a fourth embodiment of the present invention will be described.

Figure 5:
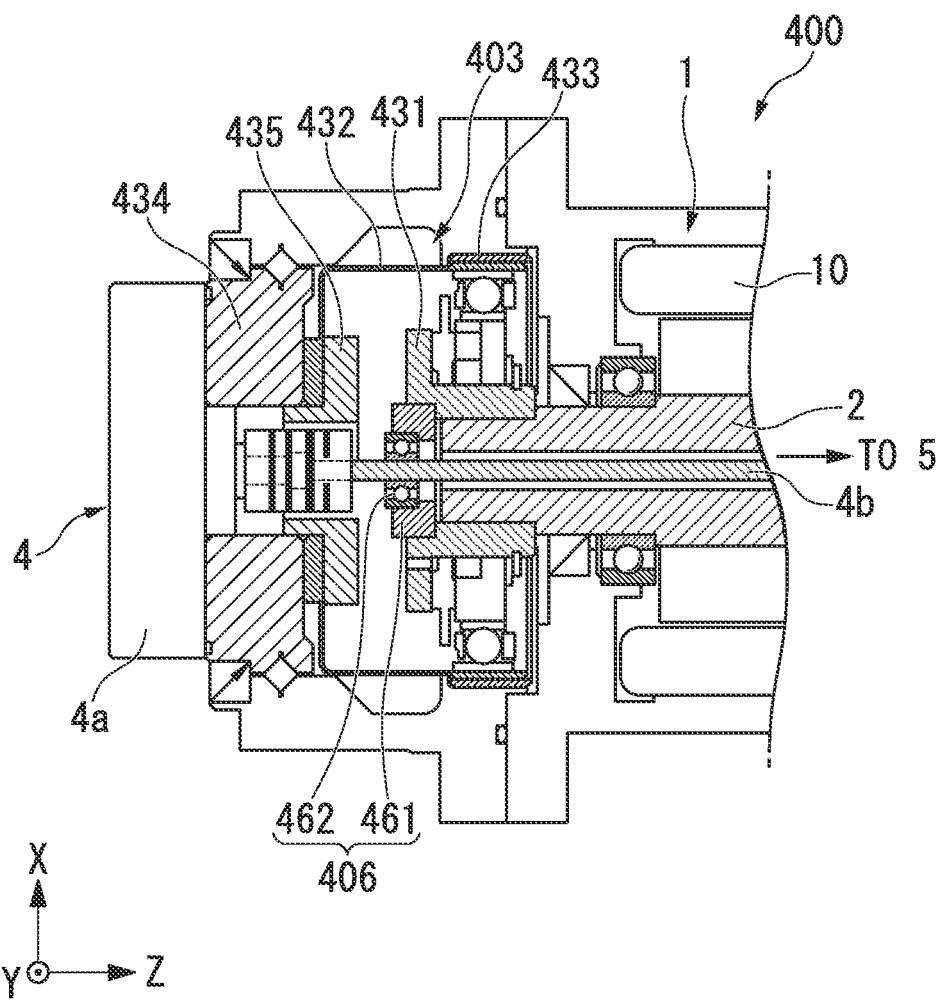
FIG. 5 is a cross-sectional view of a partial configuration of a drive apparatus according to a fourth embodiment.

FIG. 5 is a cross-sectional view illustrating a configuration of a drive apparatus 400 according to the fourth embodiment. In this embodiment, constituents identical or equivalent to the constituents of the first embodiment are denoted by the same reference numerals, and the description thereof will be omitted or simplified.

This embodiment is different from the above-described embodiments in that, as a prevention part, a contact type seal bearing (a shielding part, a shield) 406 is provided between a reduction gear 403 and the input shaft 2. The reduction gear 403 has a first transmission member 431, a second transmission member 432, a third transmission member 433 and a fourth transmission member 434. Other configurations are the same as those of the first embodiment. This embodiment, for example, can be used for applications in which the torsional vibration and the lateral vibration transmitted to the detector shaft are not large.

The seal bearing 406 is disposed on the −Z side of the end portion 2b of the input shaft 2. The seal bearing 406 is disposed in a contact manner over the circumference of the outer circumferential surface of the second shaft part 4b of the output shaft 4. Thus, the hollow portion 2a of the input shaft 2 is in the state of being blocked by the seal bearing 406.

Therefore, the movement of the foreign substance attempting to move in the Z direction along the second shaft part 4b is prevented.

Further, the seal bearing 406 is disposed between the first transmission member 431 of the reduction gear 403 and the second shaft part 4b of the output shaft 4. Thus, the movement of the foreign substance (lubricant or the like) attempting to flow out between the first transmission member 431 and the second shaft part 4b is prevented.

The seal bearing 406 covers the inner circumferential surfaces between the first transmission member 431 of the reduction gear 403 and the second shaft part 4b of the output shaft 4. Thus, the movement of the foreign substance (lubricant or the like) attempting to flow out between the first transmission member 431 and the second transmission member 432 is prevented.

Further, the seal bearing 406 is configured to be in contact with the second shaft part 4b of the output shaft 4. Thus, the seal bearing 406, for example, can be used when the second shaft part 4b rotates at a low speed, and can prevent the movement of the foreign substance.

Fifth Embodiment

Next, a fifth embodiment of the present invention will be described.

Figure 6:
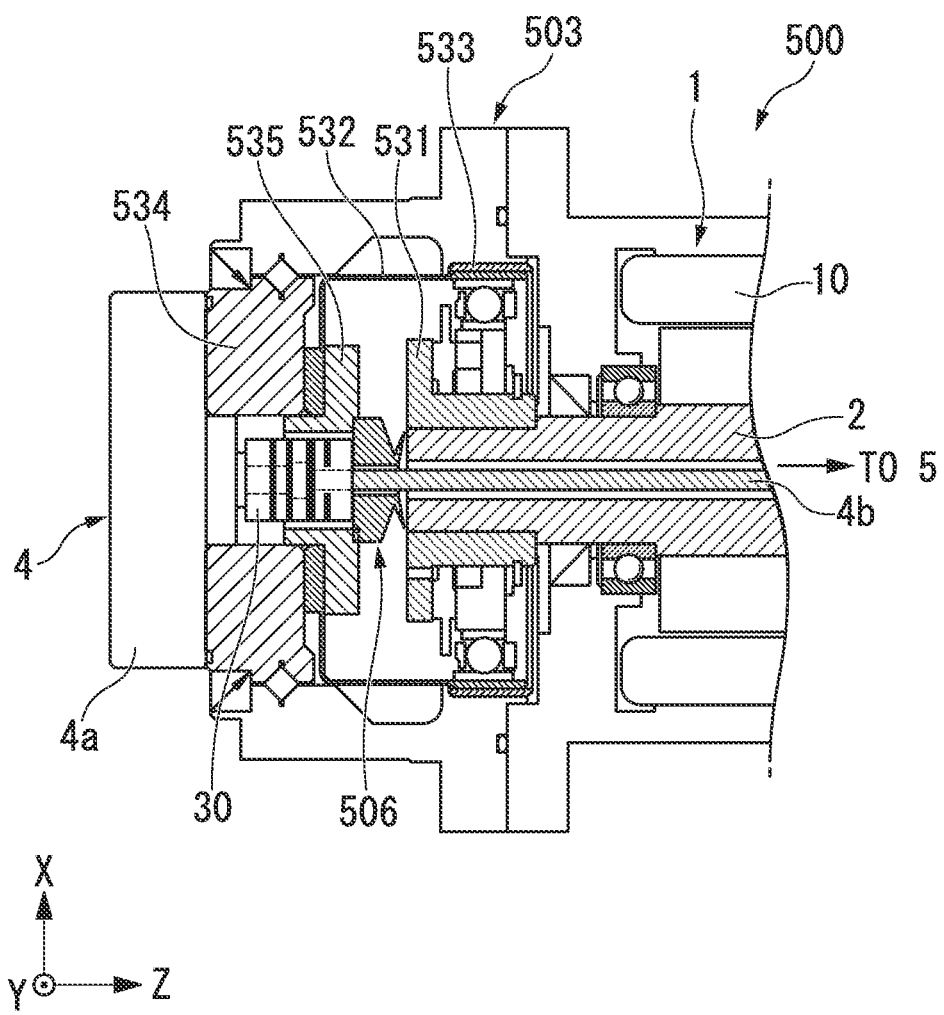
FIG. 6 is a cross-sectional view of a partial configuration of a drive apparatus according to a fifth embodiment.

FIG. 6 is a cross-sectional view illustrating a configuration of a drive apparatus 500 according to the fifth embodiment. In this embodiment, constituents identical or equivalent to the constituents of the first embodiment are denoted by the same reference numerals, and the description thereof will be omitted or simplified.

This embodiment is different from the above-described embodiments in that, as a prevention part, a contact type ring mechanism (a shielding part) 506 is provided between a reduction gear 503 and the input shaft 2. The reduction gear 503 has a first transmission member 531, a second transmission member 532, a third transmission member 533 and a fourth transmission member 534. Other configurations are the same as those of the first embodiment. Since the ring mechanism 506, for example, can be easily used when the second shaft part 4b rotates at a low speed, it can be used in applications in which cost reduction is required.

The ring mechanism 506 is formed in a V-shape in a cross-sectional view, and is disposed on the −Z side of the end portion 2b of the input shaft 2. The ring mechanism 506 is disposed in a contact manner over the circumference of the outer circumferential surface of the second shaft part 4b of the output shaft 4. Thus, the hollow portion 2a of the input shaft 2 is in the state of being blocked by the ring mechanism 506. Therefore, the movement of the foreign substance attempting to move in the Z direction along the second shaft part 4b can be prevented.

Further, the ring mechanism 506 is disposed between the first transmission member 531 and the third transmission member 535 of the reduction gear 503 in an astride manner. Thus, the movement of the foreign substance (lubricant or the like) attempting to flow out between the first transmission member 531 and the third transmission member 535 is prevented. The ring mechanism 506 covers the inner circumferential surfaces, over the first transmission member 531 and the fourth transmission member 534 of the reduction gear 503 in an astride manner. Therefore, the movement of the foreign substance (such as a lubricant) attempting to flow out between the second transmission member 532 and the third transmission member 533 is prevented.

Sixth Embodiment

Next, a sixth embodiment of the present invention will be described.

Figure 7:
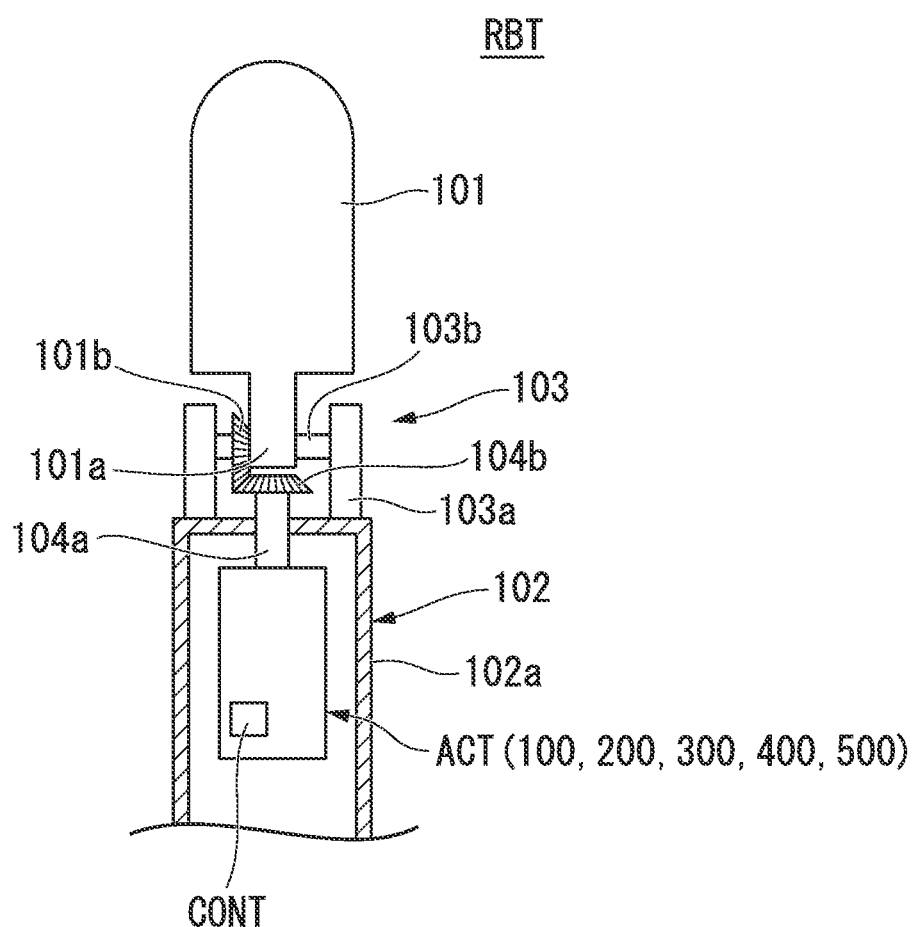
FIG. 7 is a diagram illustrating a configuration of a robot device according to a sixth embodiment.

FIG. 7 is a diagram illustrating a configuration of a part (a tip of a finger portion) of a robot device RBT equipped with the drive apparatus ACT (100, 200, 300, 400 or 500) according to any one of the aforementioned embodiments.

As illustrated in FIG. 7, the robot device RBT has a distal joint section 101, an intermediate joint section 102 and a joint section 103, and has a configuration in which the distal joint section 101 and the intermediate joint section 102 are connected via the joint section 103. A shaft support section 103a and a shaft part 103b are provided at the joint section 103. The shaft support section 103a is fixed to the intermediate joint section 102. The shaft part 103b is supported in a state of being fixed by the shaft support section 103a.

The distal joint section 101 has a connecting section 101a and a gear 101b. The shaft part 103b of the joint section 103 passes through the connecting section 101a, and the distal joint section 101 is rotatable about the shaft part 103b as the rotation axis. The gear 101b is a bevel gear fixed to the connecting section 101a. The connecting section 101a is adapted to rotate integrally with the gear 101b.

The intermediate joint section 102 has a housing 102a and a drive apparatus ACT. The drive apparatuses 100 to 500 described in the above embodiments can be used as the drive apparatus ACT. The drive apparatus ACT is provided inside the housing 102a. A rotary shaft member 104a is attached to the drive apparatus ACT. A gear 104b is provided at the tip of the rotary shaft member 104a. The gear 104b is a bevel gear that is fixed to the rotary shaft member 104a. The gear 104b is in a state of being engaged with the gear 101b.

In the robot device RBT configured as described above, the rotary shaft member 104a is rotated by the driving of the drive apparatus ACT, and the gear 104b rotates integrally with the rotary shaft member 104a.

The rotation of the gear 104b is transmitted to the gear 101b engaged with the gear 104b, and the gear 101b rotates. The connecting section 101a rotates as the gear 101b rotates, and thus, the distal joint section 101 rotates about the shaft part 103b.

Thus, according to this embodiment, by mounting the drive apparatus ACT, it is possible to rotate the distal joint section 101, for example, at high rotational position accuracy.

The technical scope of the present invention is not limited to the above embodiments, and appropriate modifications can be added without departing from the scope of the present invention.

Figure 8:
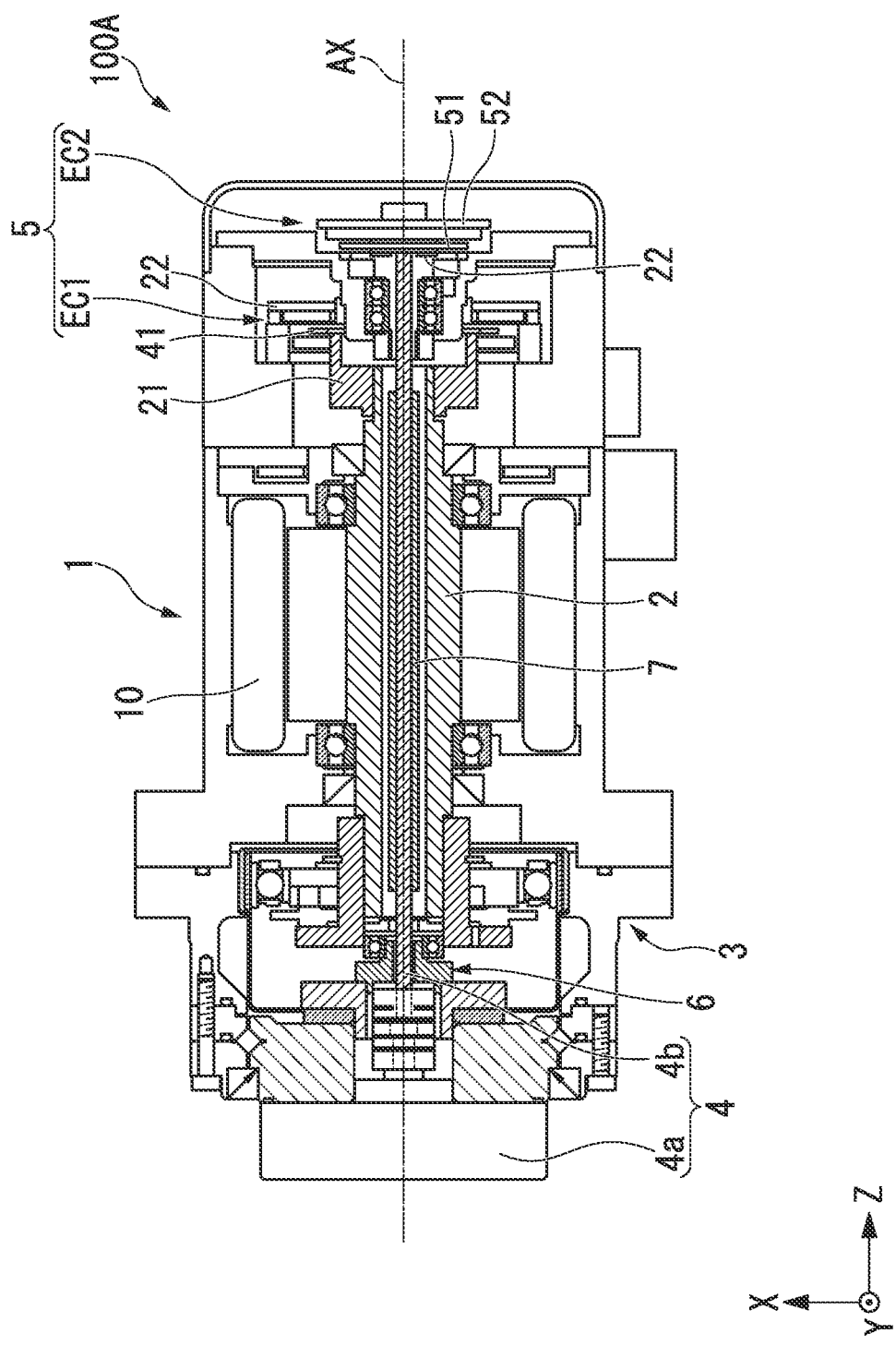
FIG. 8 is a cross-sectional view of a partial configuration of a drive apparatus according to a modified example.

For example, as illustrated in FIG. 8, in addition to the configuration of the first embodiment, a drive apparatus 100A having a configuration in which a protective member (a vibration suppression section, a vibration suppressor) 7 is disposed on the outer circumferential surface of the second shaft part 4b of the output shaft 4 may be adopted.

When the drive apparatus 100A is connected to an external mechanism, in some cases, the vibration of the external mechanism may be transmitted to the second detection device EC2 via the first shaft part 4a and the second shaft part 4b of the output shaft 4. By providing the protective member 7, the transmission of vibration of the external mechanism is suppressed. Thus, it is possible to perform highly accurate detection. As the protective member 7, for example, rubber or the like is used, but it is also possible to appropriately select and use a vibration-proof material other than rubber.

Also, for example, in the above-described first embodiment, the controller CONT may be configured to perform fully-closed loop control. For example, the controller CONT performs the fully-closed loop control in the configuration in which the first detection device EC1 and the second detection device EC2 are provided, thereby making it possible to control the rotation of the output shaft 4 on the reduction gear 3.

Moreover, even when the lubricant or oil mist attempts to flow out from the reduction gear 3, since the prevention part 6 is provided, the outflow is prevented. Accordingly, the detection accuracy is stable on the second detection device EC2 side. By performing the fully-closed loop control in such a configuration, it is possible to detect the rotation angle in high resolution, without increasing the size of the drive apparatus.

For example, in the drive apparatus ACT used in the robot device RBT according to the sixth embodiment, the controller CONT illustrated in FIG. 7 performs fully-closed loop control, and thus, the robot device RBT can perform the accurate positioning. Thus, it is possible to perform assembly work, such a shaft fitting operation of the bearing, which requires several tens of microns, with high precision.

What is claimed is:
1. A drive apparatus comprising:
a motor that rotates a first shaft member;
a transmission part configured to transmit rotation of the first shaft member to a second shaft member which is different from the first shaft member;
a first detection device provided at the first shaft member configured to detect information regarding rotation of the first shaft member;
a second detection device provided at the second shaft member configured to detect information regarding rotation of the second shaft member; and
a prevention part that is disposed between the first shaft member and the transmission part and that prevents movement of foreign substance toward at least one of the first detection device and the second detection device.

2. The drive apparatus according to claim 1,
wherein the foreign substance includes at least one of a discharge substance discharged from the transmission part and a fluid discharged from the transmission part.

3. The drive apparatus according to claim 1,
wherein the first shaft member has a hollow portion, and the second shaft member is at least partially inserted into the hollow portion.

4. The drive apparatus according to claim 3,
wherein the first shaft member and the second shaft member are disposed to rotate about a common rotation axis.

5. The drive apparatus according to claim 3,
wherein the first shaft member is provided to penetrate the motor so that both axial end portions of the first shaft member protrude from the motor in the rotation axis,
the transmission part is provided at one end portion of the first shaft member, and
the first detection device is provided at the other end portion of the first shaft member.

6. The drive apparatus according to claim 3,
wherein the second shaft member has a protruding portion that protrudes from the hollow portion, and
the second detection device is provided at the protruding portion.

7. The drive apparatus according to claim 3,
wherein the prevention part is provided at an outer side of the hollow portion.

8. The drive apparatus according to claim 3,
wherein the prevention part has a shielding part that shields a space which connects between the transmission part and the hollow portion.

9. The drive apparatus according to claim 8,
wherein the shielding part has a sealing portion that covers the hollow portion.

10. The drive apparatus according to claim 8,
wherein the shielding part is provided so as not to be in contact with the second shaft member.

11. The drive apparatus according to claim 3,
wherein the prevention part has a labyrinth portion disposed between the transmission part and the hollow portion.

12. The drive apparatus according to claim 11,
wherein the transmission part includes a first member and a second member, the first member is installed with a prevention member which has a plurality of protruding portions,
the second member has a plurality of protruding portions which are arranged to mesh with the plurality of protruding portions of the prevention member, and
the labyrinth portion includes the prevention member and the second member.

13. The drive apparatus according to claim 1,
wherein the prevention part is provided on at least one of the first shaft member and the second shaft member.

14. The drive apparatus according to claim 1, further comprising:
a vibration suppression part that suppresses vibration of the second shaft member.

15. The drive apparatus according to claim 14,
wherein the vibration suppression part has a coupling part that connects the first shaft member and the second shaft member.

16. A robot device comprising:
a shaft member;
a drive apparatus that drives the shaft member; and
a controller that controls the drive apparatus,
wherein the drive apparatus according to claim 1 is used as the drive apparatus.

17. The drive apparatus according to claim 1,
wherein the first detection device has a first detecting part configured to detect information regarding rotation of a first scale fixed to one end portion of the first shaft member, and
the second detection device has a second detecting part configured to detect information regarding rotation of a second scale fixed to one end portion of the second shaft member.

18. The drive apparatus according to claim 17,
wherein the first shaft member has a hollow portion,
a part of the second shaft member is inserted into the hollow portion of the first shaft member, and
the transmission part connects an other end portion of the first shaft member and an other end portion of the second shaft member.

19. The drive apparatus according to claim 18,
wherein the prevention part has a shielding part that shields a space between the hollow portion of the first shaft member and the transmission part.

20. The drive apparatus according to claim 19,
wherein the shielding part is disposed at a side closer to the other end portion of the first shaft member and contacts with the second shaft member.

21. The drive apparatus according to claim 20,
wherein the shielding part shields the hollow portion of the first shaft member by the contact with second shaft member.

22. The drive apparatus according to claim 21,
wherein the shielding part is an oil seal mechanism.

23. The drive apparatus according to claim 22,
wherein the oil seal mechanism is disposed over a whole circumference of an outer circumference surface of a shaft part of the second shaft member.

24. The drive apparatus according to claim 21,
wherein the shielding part is a seal bearing mechanism.

25. The drive apparatus according to claim 24,
wherein the seal bearing mechanism is disposed over a whole circumference of an outer circumference surface of a shaft part of the second shaft member.

* * * * *